(12) United States Patent
Yuill et al.

(10) Patent No.: US 6,419,893 B1
(45) Date of Patent: Jul. 16, 2002

(54) PROCESS FOR PRODUCING AND COOLING TITANIUM DIOXIDE

(75) Inventors: William A. Yuill; Charles A. Natalie; Harry E. Flynn, all of Edmond; Bita Fillipi, Norman, all of OK (US)

(73) Assignee: Kerr-McGee Chemical LLC, Oklahoma City, OK (US)

( * ) Notice: Subject to any disclaimer, the term of this patent is extended or adjusted under 35 U.S.C. 154(b) by 11 days.

(21) Appl. No.: 09/664,334

(22) Filed: Sep. 18, 2000

(51) Int. Cl.[7] ............................................... C01G 23/07
(52) U.S. Cl. ........................................ 423/613; 106/437
(58) Field of Search ................................ 423/610, 613, 423/614; 106/437

(56) References Cited

U.S. PATENT DOCUMENTS

| | | | |
|---|---|---|---|
| 3,273,599 A | 9/1966 | Heeren | 138/38 |
| 3,443,630 A | 5/1969 | Auld | 165/1 |
| 3,615,202 A * | 10/1971 | Stern et al. | 23/202 |
| 4,066,424 A | 1/1978 | Kilgren et al. | 55/71 |
| 4,462,979 A | 7/1984 | Stevens et al. | 423/613 |
| 4,937,064 A | 6/1990 | Gonzalez | 423/613 |
| 5,266,108 A | 11/1993 | Hauck | 106/437 |
| 5,372,639 A | 12/1994 | Gonzalez | 106/437 |
| 5,508,015 A | 4/1996 | Gonzalez | 423/613 |
| 5,538,708 A | 7/1996 | Gonzalez | 423/613 |
| 5,840,112 A * | 11/1998 | Morris et al. | 106/442 |
| 6,207,131 B1 * | 3/2001 | Magyar et al. | 423/613 |

* cited by examiner

Primary Examiner—Steven P. Griffin
Assistant Examiner—Edward M. Johnson
(74) Attorney, Agent, or Firm—McAfee & Taft; C. Clark Dougherty, Jr.

(57) ABSTRACT

An improved process for producing titanium dioxide wherein gaseous titanium tetrachloride and oxygen are reacted at a high temperature to produce particulate solid titanium dioxide and gaseous reaction products is provided. The titanium dioxide and gaseous reaction products are cooled by passing them through a tubular heat exchanger along with a scouring medium for removing deposits from the inside surfaces of the tubular heat exchanger. By this invention, the particulate scouring medium, the particulate titanium dioxide and the gaseous reaction products are caused to follow a spiral path as they flow through the tubular heat exchanger whereby the scouring medium more thoroughly removes the deposits and the titanium dioxide and gaseous reaction products are cooled more efficiently.

16 Claims, 1 Drawing Sheet

PROCESS FOR PRODUCING AND COOLING TITANIUM DIOXIDE

BACKGROUND OF THE INVENTION

1. Field of the Invention

The present invention relates to processes for producing and cooling titanium dioxide, and more particularly, to such processes wherein the cooling of the titanium dioxide and gaseous reaction products produced is more efficiently carried out.

2. Description of the Prior Art

In the production of titanium dioxide utilizing the chloride process, heated gaseous titanium tetrachloride and heated oxygen are combined in a tubular reactor at high flow rates. A high temperature oxidation reaction takes place in the reactor whereby particulate solid titanium dioxide and gaseous reaction products are produced. The titanium dioxide and gaseous reaction products are cooled by passing them through a tubular heat exchanger along with a scouring medium for removing deposits from the inside surfaces of the heat exchanger. The scouring medium utilized heretofore has been a particulate solid such as sand, sintered or compressed titanium dioxide, rock salt or the like. In spite of the use of a scouring medium, the solid titanium dioxide and other deposits on the inside surfaces of the tubular heat exchanger have only been partially removed thereby leaving deposits which reduce the heat transfer efficiency of the heat exchanger.

Thus, there are needs for improved processes for producing and cooling titanium dioxide whereby deposits in the heat exchanger utilized are more thoroughly removed and high efficiency cooling takes place.

SUMMARY OF THE INVENTION

The present invention provides an improved process for producing and cooling titanium dioxide which meets the needs described above and overcomes the deficiencies of the prior art. The improved process of this invention basically comprises the steps of reacting gaseous titanium tetrachloride and oxygen at a high temperature to produce particulate solid titanium dioxide and gaseous reaction products. The produced particulate solid titanium dioxide and gaseous reaction products are cooled by heat exchange with a cooling medium in a tubular heat exchanger. A scouring medium is injected into the heat exchanger for removing deposits of titanium dioxide and other materials from the inside surfaces of the heat exchanger. In order to increase the removal of the deposits from the surfaces and thereby increase the heat transfer efficiency in the heat exchanger, the scouring medium is caused to follow a spiral path through the heat exchanger. After passing through the heat exchanger, the particulate solid titanium dioxide is separated from the gaseous reaction products.

It is, therefore, a general object of the present invention to provide an improved process for producing and cooling titanium dioxide.

Other and further objects, features and advantages of the present invention will be readily apparent to those skilled in the art upon a reading of the description of the preferred embodiments which follows when taken in conjunction with the accompanying drawings.

DESCRIPTION OF PREFERRED EMBODIMENTS

Figure 1:
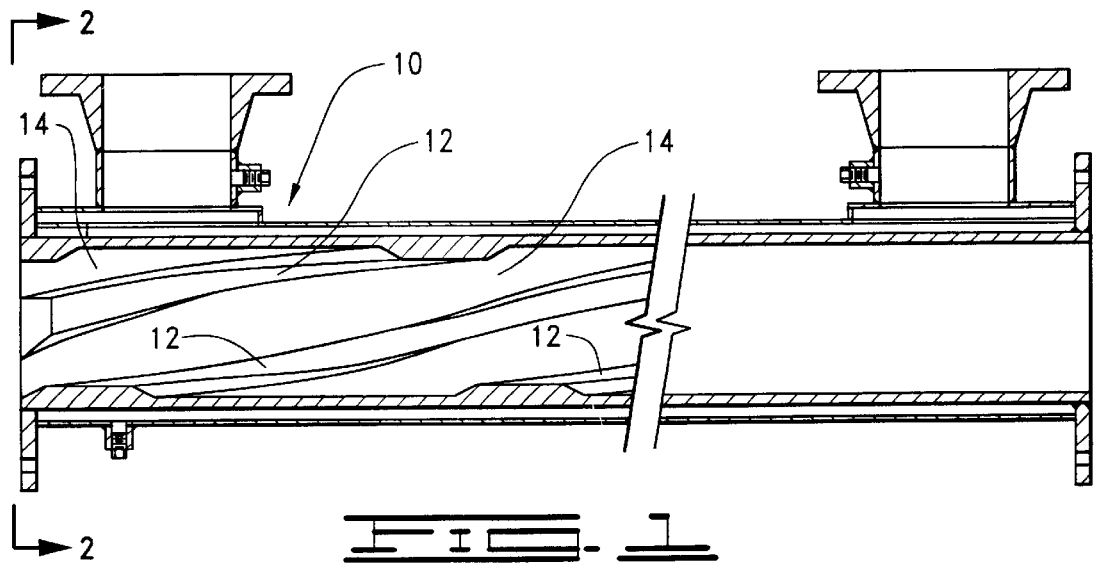
FIG. 1 is a side cross-sectional view of a tubular heat exchanger section which includes spiraling vanes and recesses in accordance with this invention.

Titanium dioxide pigment has heretofore been produced by reacting heated gaseous titanium tetrachloride and heated oxygen in a tubular reactor at high temperatures. The titanium tetrachloride can include aluminum chloride in an amount sufficient to produce a rutile pigment containing between about 0.3% to about 3% by weight aluminum oxide. Typically, the titanium tetrachloride is preheated to a temperature in the range of from about 650° F. to about 1800° F. depending upon the particular preheater apparatus utilized. The oxygen is typically preheated to a temperature in the range of from about 1750° F. to about 3400° F. The oxidation reaction temperature at a pressure of one atmosphere is typically in the range of from about 2300° F. to about 2500° F. The reaction produces particulate solid titanium dioxide and gaseous reaction products. The reaction products are immediately introduced into an elongated tubular heat exchanger wherein the reaction products are cooled by heat exchange with a cooling medium such as cooling water. The elongated tubular heat exchanger is usually made up of a plurality of individual heat exchanger sections which are sealingly bolted together. The heat exchanger sections and overall length of the heat exchanger can vary widely depending on factors such as the titanium dioxide production rate, the desired discharge temperature, the diameter of the heat exchanger, etc. Consequently, commercial producers of titanium dioxide that utilize the chloride process, i.e., the process of oxidizing titanium tetrachloride, use heat exchangers of varying diameters and lengths to cool the reaction products. In an example of one such heat exchanger, the heat exchanger sections have an internal diameter of 7 inches and are from about 7 feet to about 16 feet long. The elongated tubular heat exchanger often also includes an adapter section which is from 1 foot to 4 feet long. While passing through the elongated tubular heat exchanger, the titanium dioxide and gaseous reaction products are cooled to a temperature of about 1300° F. or less.

In order to prevent the build-up of deposits formed of titanium dioxide and other materials produced in the oxidation reaction, a scouring medium has been injected into the tubular heat exchanger along with the reaction products. Examples of scouring media which can be used include, but are not limited to, sand, mixtures of titanium dioxide and water which are pelletized, dried and sintered, compressed titanium dioxide, rock salt, fused alumina, titanium dioxide and salt mixtures and the like. The salt mixed with titanium dioxide can be potassium chloride, sodium chloride and the like.

The scouring medium impinges on the inside surfaces of the heat exchanger and removes deposits therefrom. While the scouring medium removes some of the deposits, it often does not remove all of the deposits and as a result, a layer of the deposits on the inside surfaces of the heat exchanger remains. The remaining layer of deposited material decreases the heat transfer rate from the reaction products being cooled through the walls of the heat exchanger and into the cooling medium. This in turn significantly decreases the efficiency of the heat exchanger and increases the overall costs of producing the titanium dioxide by requiring the installation and maintenance of a longer heat exchanger and requiring a greater amount of the scouring medium. After the reaction products are cooled, the particulate solid titanium dioxide is separated from the gaseous reaction products and the scouring medium.

The present invention is based on the discovery that the removal of the deposits from the inside surfaces of the heat exchanger can be improved by causing the scouring medium to follow a spiral path through the heat exchanger. While various techniques can be utilized for causing the scouring medium to follow a spiral path through the heat exchanger, a presently preferred technique is to provide one or more spiraling vanes on the inside surfaces of at least a portion of one or more of the individual heat exchanger sections. Preferably, for 7 inch to 11 inch internal diameter heat exchanger sections, two or more spiraling vanes having spiraling recesses therebetween are provided in 8 foot portions of two or more of the individual heat exchanger sections. Most preferably from, four to six spiraling vanes with four to six spiraling recesses therebetween are provided in the spiraled portions of the sections.

Figure 2:
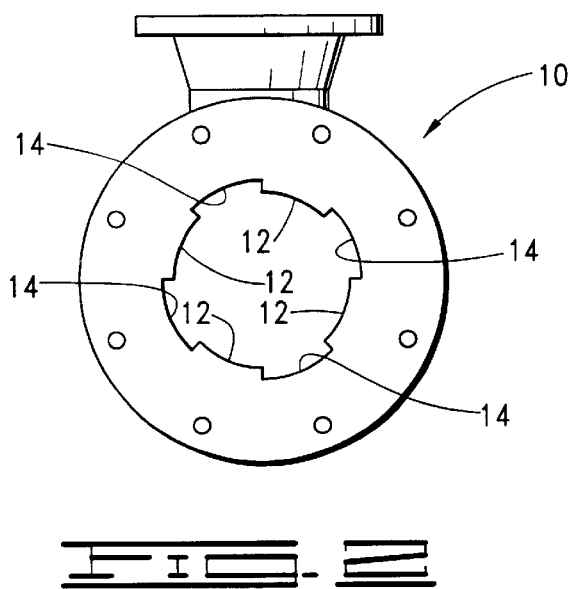
FIG. 2 is an end view taken along line 2—2 of FIG. 1.

Referring now to the drawings, one of the individual 7 inch internal diameter by 16 feet long heat exchanger sections making up an elongated heat exchanger for cooling the reaction products is illustrated and generally designated by the numeral 10. The heat exchanger section 10 includes four spiraling vanes 12 with four recesses 14 therebetween extending over an 8 foot internal portion thereof. As shown in FIG. 1, the vanes 12 and recesses 14 rotate over the initial 8 foot internal surface length of the heat exchanger 10. The rate of rotation of the spiraling vanes and recesses is constant and is generally in the range of from about 2 degrees per inch to about 6 degrees per inch, preferably about 4.5 degrees per inch. As shown in FIG. 2, the spiraling vanes 12 and recesses 14 have curved rectangular cross-sectional shapes. Generally, the heights, widths and rate of rotation of the spiraling vanes are such that for an individual heat exchanger section containing the vanes over its initial 8 feet of internal surface length, the maximum pressure drop at the maximum reaction products flow rate through the section is 0.2 pounds per square inch. A further requirement is that the scouring medium completely scours the inside surfaces of the heat exchanger section including the surfaces of the spiraling recesses. These criteria are met, for example, by a heat exchanger section having a length of 16 feet, an internal surface diameter of 7 inches and having four curved rectangular vanes equally spaced over the initial 8 feet of internal surface therein when the vanes are 0.5 inch high, 1.5 inches wide and have a rate of rotation of 4.3 degrees per inch and when a scouring medium having a specific gravity of 2 and a particle size of 0.028 inch is utilized with an inlet gaseous reaction product flow rate of 6.6 pounds per second at a temperature of 1750° F.

As mentioned, all of the heat exchanger sections utilized to make up the elongated tubular heat exchanger can include spiraling vanes and recesses. Generally, however, the heat exchanger sections which include spiraling vanes and recesses in the elongated heat exchanger can be separated by several heat exchanger sections which do not include spiraling vanes and recesses. The number of heat exchanger sections which do not include vanes and recesses depends on whether those heat exchanger sections are thoroughly cleaned by the scouring medium under the operating conditions involved.

The vanes can be formed of a corrosion resistant alloy such as an alloy of nickel and chromium or they can be formed of a ceramic wear resistant material such as alumina, silicon carbide or the like. Also, the vanes can be hollow so that the cooling medium will keep them cooler, heat transfer will be increased and pigment deposits will be reduced.

The improved process of this invention for producing and cooling particulate solid titanium dioxide is comprised of the following steps. Heated gaseous titanium tetrachloride and heated oxygen are reacted at a high temperature, i.e., a temperature of at least about 2200° F., to produce particulate solid titanium dioxide and gaseous reaction products. The titanium dioxide and gaseous reaction products are cooled by passing them through an elongated tubular heat exchanger along with a scouring medium for removing deposits from the inside surfaces of the heat exchanger. The scouring medium and the particulate titanium dioxide and gaseous reaction products are caused to follow a spiral path as they flow through the elongated tubular heat exchanger whereby the scouring medium thoroughly removes the deposits. In accordance with the presently preferred embodiment of the invention, the particulate titanium dioxide and gaseous reaction products are caused to follow the spiral path by providing one or more spiraling vanes on the inside surfaces of all or spaced portions of the elongated tubular heat exchanger.

A more specific process of the present invention for producing particulate solid titanium dioxide comprises the steps of: (a) reacting gaseous titanium tetrachloride and oxygen at a temperature in the range of at least about 2200° F. to produce particulate solid titanium dioxide and gaseous reaction products; (b) cooling the produced particulate solid titanium dioxide and gaseous reaction products with a cooling medium in a tubular heat exchanger to a temperature about 1300° F. or less; (c) injecting a scouring medium into the heat exchanger for removing deposits from the inside surfaces thereof; (d) causing the scouring medium to follow a spiral path through the heat exchanger and thereby increase the removal of deposits from the surfaces by providing one or more spiraling vanes on the inside surface of all or a portion of the tubular heat exchanger; and (e) separating the particulate solid titanium dioxide from the scouring medium and the gaseous reaction products.

In order to further illustrate the improved process of the present invention, the following example is given.

EXAMPLE

A series of tests were performed to increase the efficiency of an elongated tubular heat exchanger used for cooling the titanium dioxide and gaseous reaction products produced in the chloride process. The heat exchanger was instrumented to determine the effectiveness of heat transfer and consisted of a number of sections of water jacketed pipe. Cooling water flowed through the jacket and reaction products from the reactor consisting of a mixture of $Cl_2$, $TiO_2$ pigment, and 5 to 10 percent $O_2$ flowed through the interior of the pipe. The heat exchanger sections were about 16 feet long and were connected together by flanges. An external water pipe called a jumper connected the water jacket of one section to the water jacket of the adjacent section. A thermocouple was placed in each jumper and total water flow through the heat exchanger sections was measured at the inlet to the sections. The amount of heat that was transferred from the reaction products stream to the water in each heat exchanger section was determined from the difference in temperature between the water inlet and outlet and the water flow rate. The gas temperature for the heat exchanger sections was calculated from a mass balance for the reactor, the amount of heat fed to the reactor with the reactant feed streams and the total heat lost from the reactor upstream of the sections. A heat transfer coefficient was calculated for each heat exchanger section from the temperature of the product stream and the amount of heat that was transferred to the cooling water in that section.

The calculated heat transfer coefficients were then compared to the heat transfer coefficients calculated from empirical heat transfer correlations available in the open literature for particulate free gases. It was anticipated that the correlations for particulate loaded gases would be different than for clean gases, but it seemed probable that there would be a relatively constant ratio between the coefficient measured for the heat exchanger sections and the coefficients calculated for clean gas. The results indicated that the deviation between the values calculated from empirical correlations and those determined experimentally were much greater for the sections near the exit of the elongated heat exchanger than for those at the inlet. It seemed likely that the difference could be due to deposits in the sections. Tests were then initiated to develop methods for improving heat transfer near the exit of the elongated heat exchanger. The tests were performed using the last 8 sections of the elongated heat exchanger. All of the sections were 7-inches in diameter and approximately 16-feet in length except for the last section which was an adapter for attaching the elongated heat exchanger to the product collection section. The adapter section was 4-feet in length and slightly larger in diameter than the other sections. The results of all of the tests are given in the Table below.

Test 1

A control test was performed using silica sand as the scouring medium. The product rate for the reactor was set at a level that could be maintained even if heat transfer rates were to change significantly. The ratios of the measured heat transfer coefficients to theoretical heat transfer coefficients were determined. The results indicate that the difference between the actual coefficients and the theoretical coefficients increases as the gases move down the elongated heat exchanger.

Test 2

In the second test, a device was placed in the middle of a heat exchanger section to introduce $N_2$ tangentially into the section. The reactor produced $TiO_2$ pigment at a rate of about 130 to 150 pounds per minute. Approximately 200 standard cubic feet of $N_2$ was introduced into the section over a period of several minutes. The result was that the heat transfer improved measurably over the entire product cooler downstream of the point of injection. The increase in heat transfer was attributed to more efficient scouring rather than increased turbulence for two reasons. The first was that the increase in heat transfer was observed as far as 100 section diameters downstream from the point of $N_2$ injection. Calculations and published data indicated that any increase in heat transfer due to turbulence decreases rapidly and disappears completely within about 20 pipe diameters downstream[1,2]. The second reason that the increase was due to better scouring was that the increase in heat transfer was observed to continue for sometime after the $N_2$ flow had stopped.

Test 3

A scouring medium of $TiO_2$ was prepared by agglomerating unfinished pigment, heat treating the material to produce a suitably hard material and then screening the material to provide a particle size distribution similar to that of the silica sand that had been used. The $TiO_2$ scouring medium was fed at the front of the reactor. The results of this test were similar to the results of Test 1.

Test 4

A heat exchanger section having spiraling vanes and recesses as shown in FIGS. 1 and 2 was installed in place of heat exchanger section No. 6. The portion of the heat exchanger section which included the spiraling vanes and recesses was the first 8 feet of the section. The scouring medium was the same as used in Test 3, and the product rate was approximately the same as in Tests 1 and 3. The results indicate that the average heat transfer coefficient for section No. 7 immediately downstream of section No. 6 was significantly higher than the average heat transfer coefficient for section No. 7 in Test 3. The average heat transfer coefficient for section No. 8 that was 32 feet or 55 pipe diameters from the end of the spiraling vanes and recesses was slightly higher than the average heat transfer coefficient for section No. 8 in Test 3.

Test 5

The heat exchange section including the spiraling vanes and recesses was installed in place of section No. 11 and a test similar to Test 4 was performed. The results indicate that a significant improvement was obtained even for section No. 13 that was 26 feet or more than 47 pipe diameters from the end of section No. 11.

Additional Tests

A test similar to Test 5 was performed using spiraling vanes with a ceramic material. The heat transfer results for sections No. 12 and No. 13 with the ceramic vanes were the same as for Test No. 5. The heat transfer within the section containing the vanes was dependent on the conductivity of the material used for the vanes and the design of the vanes. In another set of tests, the temperature of the gases exiting the bag filter was determined when the heat exchanger was operated without spiraling vanes. Vanes were then installed in place of section No. 11 and the production rate increased until the temperature of the gases exiting the bag filters had reached that same temperature. The results were that without the vanes, a production rate of 97 tons per day resulted in an exit temperature of 369° F. and with vanes, a production rate of 119 tons per day resulted at an exit temperature of 363° F. "INCONEL™" vanes were operated for over 30 hours. No measurable wear was found on the vanes and raw pigment quality was excellent. No deposits were found on the vanes.

The results of the tests indicate that the spiraling vanes and recesses increase the effectiveness of the scouring medium. It is believed that the decrease in the ratio of the actual to theoretical heat transfer coefficients as the gases approach the end of the elongated heat exchanger is due to increased deposits near the end of the heat exchanger. This is consistent with the vanes being more effective in the No. 11 position than in the No. 6 position. Calculations indicate that at the production rates used in the tests described, the increase in pressure drop through 150 feet of spiraling vanes as compared to smooth pipe would be in the order of only a few pounds per square inch. For this reason, two to four heat exchanger sections including 8-foot spiraling vane portions can be spaced at various distances apart in the elongated heat exchanger. Continuous spiraling vanes in the elongated heat exchanger can also be utilized if the cost of the vanes permits. The results also indicate the spiraling vanes can be made of an alloy such as "INCONEL™" 600 or ceramic materials such as silicon carbide ceramic, alumina, or a composite ceramic. The use of ceramics is advantageous if wear or chemical attack becomes a problem.

REFERENCES

1. A. H. Algifri, R. K. Bhardwaj, Y. V. N. Rao; "Heat transfer in turbulent decaying swirl flow in a circular pipe," *Int. J. Heat & Mass Transfer*, Vol. 31(8), pp. 1563–1568 (1988).
2. N. Hay, P. D. West; "Heat transfer in free swirling flow in a pipe," *Trans ASME J. Heat Transfer*, 97, pp. 411–416 (1975).

TABLE

Ratios Of Measured To Theoretical Heat Transfer Coefficients

| Test Number | 1 | 2 | 3 | 4 | 5 |
|---|---|---|---|---|---|
| $TiO_2$ Production Rate, tons per day | 104 | — | 108 | 105 | 108 |
| Location of Spiraling Vanes and Recesses (8' portions) | None | None - $N_2$ injected at No. 8 | None | No. 6 | No. 11 |
| Heat Exchange Section No. 6 Ratio | 0.8 | — | 0.81 | — | 0.81 |
| Heat Exchange Section No. 7 Ratio | 0.73 | — | 0.75 | 0.86 | 0.72 |
| Heat Exchange Section No. 8 Ratio | 0.57 | — | 0.61 | 0.64 | 0.57 |
| Heat Exchange Section No. 9 Ratio | 0.58 | — | 0.62 | 0.62 | 0.55 |
| Heat Exchange Section No. 10 Ratio | 0.52 | — | 0.58 | 0.56 | 0.56 |
| Heat Exchange Section No. 11 Ratio | 0.50 | — | 0.58 | 0.49 | — |
| Heat Exchange Section No. 12 Ratio | 0.39 | — | 0.46 | 0.44 | 0.61 |
| Heat Exchange Section No. 13 Ratio | 0.42 | — | 0.53 | 0.40 | 0.67 |

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. In a process for producing titanium dioxide wherein gaseous titanium tetrachloride and oxygen are reacted at a high temperature to produce particulate solid titanium dioxide and gaseous reaction products and the titanium dioxide and gaseous reaction products are ccoled by passing them through a tubular heat exchanger along with a scouring medium for removing deposits from the inside surface of the tubular heat exchanger, the improvement which comprises causing said scouring medium, said particulate titanium dioxide and said gaseous reaction products to follow a spiral path as they flow through said tubular heat exchanger.

2. The process of claim 1 wherein said scouring medium is selected from the group consisting of mixtures of titanium dioxide and water which are pelletized, dried and sintered, compressed titanium dioxide, rock salt, fused alumina and titanium dioxide and salt mixtures.

3. The process of claim 2 wherein said scouring medium is a mixture of titanium dioxide and water which is pelletized, dried and sintered.

4. The process of claim 1 wherein said scouring medium, said particulate titanium dioxide and said gaseous reaction products are caused to follow a spiral path through said heat exchanger by providing one or more spiraling vanes on the inside surfaces of all or a portion of said tubular heat exchanger.

5. The process of claim 4 wherein said one or more spiraling vanes traverse from about 2 degrees per inch to about 6 degrees per inch of additional length of the heat exchanger.

6. The process of claim 4 wherein said tubular heat exchanger is made up of a plurality of connected together heat exchanger sections.

7. The process of claim 6 wherein less than all of said heat exchanger sections include said spiraling vanes.

8. The process of claim 1 wherein the heat exchange medium utilized in said tubular heat exchanger to cool said particulate titanium dioxide and gaseous reaction products is water.

9. A process for producing particulate solid titanium dioxide comprising the steps of:

(a) reacting gaseous titanium tetrachloride and oxygen at a temperature of at least about 2100° F. to produce particulate solid titanium dioxide and gaseous reaction products;

(b) cooling said produced particulate solid titanium dioxide and gaseous reaction products with a cooling medium in a tubular heat exchanger to a temperature of about 1300° F. or less;

(c) injecting a scouring medium into said heat exchanger for removing deposits from inside surfaces of said heat exchanger;

(d) causing said scouring medium to follow a spiral path through said heat exchanger; and (e) separating said particulate solid titanium dioxide from said scouring medium and said gaseous reaction products.

10. The process of claim 9 wherein said scouring medium is selected from the group consisting of mixtures of titanium dioxide and water which are pelletized, dried and sintered, compressed titanium dioxide, rock salt, fused alumina and titanium dioxide and salt mixtures.

11. The process of claim 10 wherein said scouring medium is a mixture of titanium dioxide and water which is pelletized, dried and sintered.

12. The process of claim 9 wherein said scouring medium, said particulate titanium dioxide and said gaseous reaction products are caused to follow a spiral path through said heat exchanger by providing one or more spiraling vanes on the inside surfaces of all or a portion of said tubular heat exchanger.

13. The process of claim 12 wherein said one or more spiraling vanes traverse from about 2 degrees per inch to about 6 degrees per inch of additional length of the heat exchanger.

14. The process of claim 12 wherein said tubular heat exchanger is made up of a plurality of connected together heat exchanger sections.

15. The process of claim 14 wherein less than all of said heat exchanger sections include said spiraling vanes.

16. The process of claim 9 wherein said cooling medium is cooling water.

* * * * *